United States Patent Office 2,727,008
Patented Dec. 13, 1955

2,727,008

PROCESS FOR INCREASING THE CONCENTRATION OF A METASTABLE SILICA SOL

Ralph K. Iler, Brandywine Hundred, Del., assignor to E. I. du Pont de Nemours and Company, Wilmington, Del., a corporation of Delaware No Drawing. Application August 25, 1953, Serial No. 376,521

2 Claims. (Cl. 252—313)

This invention relates to processes for increasing the silica concentration of metastable silica sols, and more particularly to such processes in which a silica sol containing ultimate silica particles of less than about 4 millimicrons in diameter is mixed with an alkali metal silicate solution containing a higher concentration of silica than the sol, with agitation at the point of mixing sufficient to cause homogeneity substantially instantaneously, the proportion of silicate added being not more than enough to make the alkali metal ion content of the mixture 0.4 normal and the temperature being maintained below 60° C., and alkali metal ions are removed from the mixed sol and solution by passing the mixture in contact with an ion exchanger in the hydrogen form.

The silica sols with which this invention is concerned are metastable—that is, they are in an intermediate condition between being stable and being unstable against gelation. They change readily, either to a more stable form or to a less stable condition, but in any event they have sufficient stability that they can be carried through the steps of the processes herein described without precipitating as gels.

The art has not hitherto considered the possibility of increasing the concentration of metastable silica sols. All of the methods hitherto proposed for increasing the concentration of silica in sols have involved first making the sol relatively stable. However, there are a number of situations in which gelation of a relatively concentrated silica sol is advantageous. For instance, when a sol is prepared by ion exchange methods and then permitted to gel, the gel obtained has a freedom from both cations and anions which is difficult to achieve in any other manner. If special treatments are to be applied to the sol or gel, it is readily apparent that the capacity of a given plant can be increased by increasing the concentration of the metastable sol which is to be gelled.

When it is attempted to concentrate a silica sol merely by evaporating off water the sol gels at a relatively low concentration—say, about 6 per cent $SiO_2$ or less. If, on the other hand, the sol is subjected to a stabilizing treatment such as heretofore proposed, problems of destabilization of the concentrated sol are presented. For instance, if it is desired that the gel be made up of ultimate silica particles in the range, say, of 8 to 10 millimicrons, a sol in which the ultimate particles have been built up to, say, 20 millimicrons by a technique such as is described in Bechtold and Snyder United States Patent 2,574,902 cannot be used because there is no convenient way to reduce the size of the ultimate particles.

Now, according to the present invention it has been found that the concentration of silica in a metastable silica sol can be increased, without the necessity of altering the stability in a major way, by processes in which a sol of relatively low concentration is mixed with an alkali metal silicate solution of higher silica concentration with very intense agitation at the point of mixing, while maintaining the temperature below 60° C. and controlling the proportion of sodium silicate added so that the alkali metal content of the mixture does not exceed 0.4 normal, and the alkali metal ion is removed from the mixed sol and solution by passing the mixture in contact with a cation-exchanger in the hydrogen form. By operating in this manner, preferably in a cyclic process involving more than one incremental increase in the silica concentration, the sol retains sufficient stability that it does not gel in contact with the ion-exchange resin and at the same time the silica concentration can be increased up to 10 to 20 per cent $SiO_2$.

The processes of the invention can be carried out in a number of ways, including: (a) stepwise ion-exchange, in which a sodium silicate solution containing, say, 3 per cent $SiO_2$ is passed through a column in the hydrogen form, the effluent alkalized by the addition of sodium silicate, and the mixture recycled through an ion-exchange column also in the hydrogen form; this batchwise process may be repeated until the concentration of silica in the effluent reaches the desired level. Alternatively, (b) the sodium silicate solution can be fed into a reactor comprising the following, connected in series: a hold tank, an ion-exchanger containing resin in the hydrogen form, a pump and a return to the hold tank. To start the process, water can be used to partly fill the reactor. While pumping liquid through the reactor, one can continuously add a concentrated sodium silicate solution, say, containing 29 per cent $SiO_2$. The sodium silicate should be added slowly to the circulating liquor, at a point of maximum agitation. The rate of addition of silicate should be controlled, so that the sodium ion concentration in the stream leaving the zone at which the sodium silicate is added is not greater than 0.4 normal. In this manner, the silica concentration in the system is slowly increased from 0 to about 10 to 15 per cent; obviously, the first pass of the sodium silicate solution through the ion-exchanger forms a metastable silica sol, the $SiO_2$ content of which is then increased by the subsequent cycles.

The initial silica sol used as a starting material in the processes of this invention can be prepared by any of numerous methods with which the art is already familiar. For instance, it can be made by neutralizing a dilute sodium silicate solution with an acid such as hydrochloric acid. However, such a sol contains large quantities of both cations and anions which must be removed in the processes of the invention and hence nothing is gained by using such an acid neutralization. It is very much preferred to make the initial sol by passing a dilute sodium silicate solution through a cation-exchange resin in hydrogen form as taught in the Bird U. S. Patent 2,244,325. This can be done ideally by passing the diluted silicate solution through the same ion-exchange apparatus as is subsequently to be used in operating a process of the invention, thus minimizing the equipment required. A sol prepared in this manner will ordinarily have an $SiO_2$ content in the range up to about 4 per cent.

Whatever the manner used for preparing the initial silica sol it should be capable of giving a sol containing ultimate silica particles of less than about 4 millimicrons in diameter. By "ultimate" particles are meant the smallest unit particles which can be identified in the sol. It will be understood that the ultimate particles in the sol have a considerable tendency to join together into aggregates, or chains, or networks of chains. If this aggregation proceeds far enough the sol will gel. It is particularly preferred to employ silica sols in which the degree of aggregation is at a minimum. Ultimate particles larger than 4 millimicrons can readily be discerned by electron microscope examination and, hence, any substantial degree of aggregation of particles this size can likewise be observed. For measuring the size of particles in the range below that observable by the electron microscope, light-scattering techniques such as those described in Bechtold and Snyder U. S. Patent 2,574,902 can be employed.

Having selected a suitable silica sol, there is added an alkali metal silicate solution containing a higher concentration of silica than the sol. The alkali metal of the silicate can be, for instance, sodium or potassium. Since the object is to increase the concentration of silica in the sol, it is preferable that the alkali metal silicate solution have a considerably higher silica concentration than the sol, but it is also imperative that the mixing of the silicate solution and the sol be substantially instantaneous, and this result becomes more difficult to achieve as the concentration of the silicate is increased. Similarly, the addition of a very concentrated alkali metal silicate solution rapidly increases the alkali metal ion concentration. One commonly available commercial sodium silicate solution has an $SiO_2$ content of 36 per cent by weight, but has an $SiO_2:Na_2O$ weight ratio of 1.95; another commercially available solution has an $SiO_2$ content of only 30 per cent by weight, but the $SiO_2:Na_2O$ weight ratio is 3.25, meaning that it contains less sodium per unit of silica than the first solution. The latter is particularly preferred because the amount of silica which can be added in proportion to sodium ion is greater, but either of these solutions can be used to advantage, especially when high ultimate silica concentrations are desired. Silicate solutions having $SiO_2$ concentrations of 10 to 36 per cent are very practical to use in the processes.

As has already been indicated, intense agitation at the point of mixing the silicate and the silica sol is imperative. The intensity of mixing should be such as to cause the mixture to become homogeneous substantially instantaneously. This result can be achieved in numerous ways with which the art is familiar, such as mixing the materials in turbulent flow. A method peculiarly adapted to the cyclic nature of the processes of this invention is to add the silicate to the intake side of a centrifugal pump through which the silica sol is being circulated in the system. Obviously, the rate of adding the silicate solution can be controlled in coordination with the degree of agitation provided.

The proportion of silicate solution added must not be more than enough to make the alkali metal ion content of the mixture 0.4 normal. In a continuous cyclic process this can be accomplished by regulating the rate of silicate addition in proportion to the flow of silica sol. As already mentioned, the $SiO_2$:alkali oxide ratio of the silicate added will have a bearing on this rate.

While certain advantages can be achieved by operating the process with an alkali metal ion concentration as high as 0.4 normal in the mixture of sol and silicate, it is preferable that such ion concentration be maintained below 0.3 normal, and, in some instances, especially good results are obtained by maintaining the concentration below 0.25 normal, although to hold to such a low concentration considerably restricts the amount of alkali metal silicate which can be added in any single cycle.

The temperature of the mixture is maintained below 60° C. by any of various methods which will be apparent to those skilled in the art. The temperature of the silica sol or the silicate solution or both can be regulated to give the desired temperature. Ordinarily, the temperatures which prevail in temperate climates will result in temperatures below 60° C.; however, the ion-exchange step of the process is mildly exothermic and under some conditions there is sufficient buildup of heat that cooling may be desirably provided. Any temperature below 60° C. at which there is no danger of freezing can be used and, hence, temperatures as low as, say, 10° C. can be employed, but normally the temperature will be above about 20° C.

Having mixed the sodium silicate and silica sol as described, the mixture is passed in contact with an ion-exchanger in the hydrogen form and alkali metal ions are removed. Removal of the alkali metal ions causes the pH to drop rapidly. The sol is quite unstable in a pH range of 5 to 7 and, hence, the alkali metal ions are removed rapidly to lower the pH below 5 and preferably below about 4. In a column exchanger the ion-exchange capacity of the resin becomes exhausted as the process continues, and caution should be observed not to continue past the point of "break-through"—that is, the point where alkali metal ions come through the column unexchanged by reason of the exhaustion of the resin.

As the cation-exchanger, any insoluble cation-exchanger can be used, the resins of sulfonated carbonaceous exchangers or of sulfonated or sulfited insoluble phenol-formaldehyde resins or acid-treated humic material, or other similar exchangers being typical. Sulfonated coal, lignin, peat, or other insoluble sulfonated humic organic material can be used. Even more preferable are the insoluble resins made from phenols and an aldehyde, particularly formaldehyde. Such resins include those made from phenol itself, diphenylol sulfone, catechol, or naturally occurring phenols, as found, for example, in quebracho, which are modified by the introduction of sulfonic groups either on the ring or on methylene groups. Cation-exchangers which are stable in their hydrogen forms are available commercially under such trade names as "Amberlite," "Zeokarb," "Nalcite," and "Ionac." "Amberlite" is a modified phenol-formaldehyde-sulfonic acid-type resin, "Zeokarb" is a sulfonated coal of the carbonaceous zeolite type, "Nalcite" is a nuclear sulfonated polymer of styrene containing divinylbenzene, and "Ionac" is a phenol-formaldehyde sulfonate—see Ion-Exchange Theory and Application by F. C. Nachod, Academic Press, Inc., New York, N. Y., 1949, at page 385 et seq.

The exchanger is generally prepared in a granular form which is readily leached free of soluble acids or salts. If the exchanger is exhausted by use it may readily be converted to the acid form by washing with a solution of an acid such as hydrochloric, sulfuric, sulfamic, or a carboxylic acid such as formic, or the like.

One of the preferred cation-exchange resins for use according to the present invention is an aromatic hydrocarbon polymer containing nuclear sulfonic acid groups which is designated "Dowex 50" and is of the general type described in D'Alelio U. S. Patent 2,366,007, and which is fully described as to its characteristics, properties, and general mode of use in the Journal of the American Chemical Society for November 1947, volume 69, No. 11, beginning at page 2830. Another preferred cation-exchange resin is the nuclear sulfonated polymer of styrene containing divinylbenzene abovementioned.

Single-column or multiple-column exchangers can be used in accordance with practices with which the art is already familiar, or the column may be operated as an extended-bed, upflow process in which the upward movement of the liquid suspends the particles of the ion-exchange resin, as described in Dirnberger U. S. patent application Serial No. 65,511, filed December 15, 1948. In the latter type of operation special care must be taken to avoid passage of alkali metal ions through the column with attendent raising of the pH above about 4.

It is observed that the silica sol obtained by a process of the invention is in a metastable state. It can readily be stabilized, as by adding alkali and heating, or it can readily be gelled, as by raising the pH into the range of instability, that is, 5 to 7.

The silica content of the initial silica sol will ordinarily be increased by about 2 or 3 per cent in a single pass through the process as above-described. In a preferred aspect of the invention, the processes are operated in a cyclic manner so that the silica content is built up, either continuously or by a series of increments—that is, by a series of passes through the sequence of steps. Thus, the silica concentration of the effluent from the ion-exchanger can be brought up to the range of 10 to 20 per cent $SiO_2$, and this represents a preferred operation, although it will be understood that in some instances an increase of silica content from 3 up to 4 per cent will represent an advantageous application. When the silica content is to be substantially increased it is preferred to use an alkali metal silicate solution having a silica concentration of about from 10 to 36 per cent by weight as the solution added to the silica sol in the process.

There is some build-up in the size of the ultimate silica particles in a process of this invention, particularly after a series of cycles. Thus, the size of the particles will ordinarily be in the range from 4 to 10 millimicrons, and particular advantages are obtained for some purposes in using the processes for making sols with particles in the size range of 7 to 10 millimicrons.

The invention will be better understood by reference to the following illustrative examples:

*Example 1*

This process illustrates the preparation of a 10 per cent metastable silica sol by the batchwise, stepwise deionization of sodium silicate solutions.

A sodium silicate solution was prepared by diluting 530 grams of commercial sodium silicate solution (containing 28.4 per cent $SiO_2$ and having an $SiO_2:Na_2O$ ratio of 3.25) to a total volume of 5 liters. An ion-exchange column was prepared, using a 5 cm. diameter tube and "Nalcite" HCR resin, a nuclear sulfonated polymer of styrene containing divinylbenzene, in the hydrogen form. The resin bed was about 30 cm. high.

Sodium silicate solution was passed through the ion-exchange column at a rate of about 50 ml. per minute. The effluent was collected in 200 ml. increments, the first 400 ml. being discarded; all the remaining fractions which were collected had a pH less than 3.5. The effluent fractions were combined; an analysis of this solution by specific gravity indicated that the silicic acid sol contained 3 per cent $SiO_2$.

To each liter of this effluent, 106 grams of "F" grade sodium silicate solution was added, with vigorous stirring. This solution was then passed through a fresh column of the cation-exchange resin in hydrogen form. The effluent so produced contained about 5.8 per cent $SiO_2$.

This effluent was then alkalized with the concentrated, commercial sodium silicate solution, 106 grams of the sodium silicate solution being added for each liter of solution. The resulting solution was passed through an ion-exchange column in the hydrogen form in the manner above described. The effluent obtained from this reaction contained 8.0 per cent $SiO_2$.

This effluent was again treated with 106 grams of commercial sodium silicate solution for each liter of effluent. The resulting mixture was passed through an ion-exchange column using resin in the hydrogen form, and an effluent obtained which contained 10.0 per cent $SiO_2$.

In each of the last three passes through the ion-exchange column, the effluent had a pH in the range of 2 to 3; also in each case the silica sol was allowed to stand about five minutes after coming through the ion-exchange column, before it was treated with sodium silicate, in order to alkalize it.

An attempt was made to determine the surface area of the silica particles in the final sol produced by a pH titration technique. It has been found that the specific surface area of silica particles in sols can be estimated by measuring the amount of alkali required to adjust the pH of a silica sol from 4.0 to 9.0, as follows:

To determine the specific surface area of the silica particles in a sol, a quantity of sol containing 1.50 g. of silica is treated with hydrochloric acid to reduce the pH to 3.6 to 3.7. Thirty grams of sodium chloride are added, and then distilled water, to make a total volume of 150 ml. The temperature is adjusted to 25° C.±0.5°, and the pH to 4.00 with 0.1 normal sodium hydroxide, using a Beckman model G pH meter with a type E (high sodium concentration) glass electrode and standard calomel reference electrode. The quantity of sodium hydroxide required to raise the pH from 4.00 to 9.00 is determined by titrating directly. The pH is considered constant if it varies less than 0.01 unit during 30 seconds. The entire determination should be completed without delay, since erroneous results may be obtained due to slow adsorption of alkali.

The specific surface area of the sol is obtained from the equation $S_t = 32.0V - 28$, where $S_t$ is the specific surface area in $M^2/g$. determined by titration, and $V$ is the volume of 0.1 normal sodium hydroxide required to raise the pH from 4.00 to 9.00. This equation was derived by standardizing the method vs. surface area determinations using nitrogen adsorption on dry powders obtained from silica sols.

Using this titration technique, an attempt was made to determine the surface area of the particles in the silica sol produced in Example 1. Erratic results were obtained, which indicated that the surface area was greater than 1000 $M^2/g$. This indicates that the particles in the silica sol were extremely small, probably less than 3 millimicrons.

A sample of the resin from the third ion-exchange step was found by analysis to contain 0.36 per cent $SiO_2$, indicating very little pick-up in the ion-exchange column.

*Example 2*

This example illustrates the preparation of a silica sol similar to that in Example 1, except that the silica sol product of the reaction was alkalized and heated in order to grow the silica particles to a size of about 6 to 7 millimicrons.

A silica sol was prepared by passing a solution of sodium silicate containing 3 per cent $SiO_2$ and having an $SiO_2:Na_2O$ ratio of 3.25 through an ion-exchange column of "Nalcite" HCR in the hydrogen form, at a rate of 50 milliliters per minute; the column had a diameter of 5 centimeters, and a height of about 30 centimeters. The combined effluent had a pH of 2.85, and a specific gravity measured at 25° C. of 1.016; this corresponds to 3.0 per cent $SiO_2$.

To 2.4 liters of this sol was added 254 g. of a commercial sodium silicate solution (28.4 per cent $SiO_2$). The pH of this solution was 10.65. This solution was then passed through an ion-exchange column, using the above-described technique, to yield an effluent having a pH in the range of about 2.4. The specific gravity of this effluent was 1.030, corresponding to 5.3 per cent $SiO_2$. To 2.3 liters of this effluent 244 g. of the commercial sodium silicate was added, and the effluent was stored in a refrigerator at about 40° F. overnight.

The effluent was then warmed to about 30° C., and passed through a fresh bed of "Nalcite" HCR resin in the hydrogen form; 2.2 liters of effluent was collected, having a pH of below 2.4. To this effluent, 236 grams of the commercial sodium silicate was added, the pH of the mixture being 10.55. This solution was then passed through a fresh column of "Nalcite" HCR resin in the hydrogen form, to yield an effluent having a pH of 2.2, and a specific gravity of 1.054, which corresponds to 9.2 per cent $SiO_2$.

To 1.08 liters of this material was added 27.5 grams of the commercial sodium silicate, the pH of the mixture being 8.20. This material was heated under reflux for a period of 4 hours. The specific surface area of the heated sol as measured by the titration method was 433 $M^2/g$. (See Example 1.)

The specific surface area of the unheated, unalkalized sol was greater than 1000 $M^2/g$.

*Example 3*

This example illustrates the operation of a process of the invention in which a silica sol is prepared by continuously adding sodium silicate solution to an aqueous silica sol which is being continuously circulated through an ion-exchange resin in the hydrogen form.

The apparatus used for this example consisted of the following: Two ion-exchange columns in parallel, so that one column could be used for ion-exchange while the other was being regenerated. Each ion-exchange column was about 15 inches in height, and contained about 400 grams of "Nalcite" HCR resin in the hydrogen form, the weight of the resin being taken on wet, but drained. The diameter of the ion-exchange columns was about 2 inches. The effluent from the column was collected in a small receiver in which the pressure was maintained below atmospheric by vacuum. This receiver was attached to a pump, the pump to a small flask containing the electrodes from a pH meter, and the flask to a large pump. Into this pump there was inserted a feed line for the introduction of sodium silicate solution. From the pump the stream passed to a small vessel containing pH electrodes, and from this point to a hold tank, and from the hold tank to a small vessel equipped with pH electrodes, a magnetic stirrer, and an inlet for additional sodium silicate. From this vessel, the solution was returned to the ion-exchange column.

In order to start the operation, the system was flushed out with a silicic acid sol containing 2 per cent $SiO_2$ and the pumps started in operation. A commercial sodium silicate solution (containing 28.4 per cent $SiO_2$ and having an $SiO_2:Na_2O$ ratio of 3.25) was added to the pump before the hold tank at such a rate as to maintain a pH of about 9.5 to 10.0 at the pH electrode prior to the hold tank. The flow was adjusted so that the hold-up in the tank was about 30 minutes, on the average. Sodium silicate (also 28.4 per cent $SiO_2$) was added to the line leaving the hold tank, but before the ion-exchange column, so as to maintain a pH in this line of 10.5 to 10.9. The pH of the effluent coming from the ion-exchange column dropped to below 3.0 soon after the reaction was started. When the pH started to drift upward, the fresh ion-exchange column was cut in. The operation was continued for a period of about 3 hours, at which time the concentration of silica in the system was about 9.5 per cent. The specific surface area of the particles in the final sol, as measured by titration according to the method described in Example 1, was 670 $M^2/g.$, corresponding to silica particles having a diameter of about 4 millimicrons. The per cent solids in the dispersed phase as determined by viscosity measurements according to the method of Mooney (see Journal of Colloid Science 6:162–160 (1951) was 61 per cent.

*Example 4*

This example is similar to Example 3, except that the hold-up time of about 5 minutes was used in this case instead of about 30 minutes.

This product was similar to that obtained in Example 3, except that the per cent solids in the dispersed phase as determined by viscosity was 50 per cent. The final silica concentration was 9 per cent.

*Example 5*

In this example, all the silicate was added to the line in the pump prior to the hold tank, otherwise the experiment was similar to Example 3.

The product was a silica sol containing 11.8 per cent $SiO_2$, having particles of surface area 640 $M^2/g.$ (by titration), and per cent solids in the dispersed phase of 50 (by viscosity).

I claim:

1. In a process for increasing the silica concentration of a metastable silica sol the steps comprising mixing with a silica sol containing ultimate silica particles less than about 4 millimicrons in diameter and having an $SiO_2$ content of up to 4 per cent an alkali metal silicate solution having a silica concentration of about from 10 to 36 per cent by weight, with agitation at the point of mixing sufficient to cause homogeneity substantially instantaneously, the proportion fo silicate added being not more than enough to make the alkali metal ion content of the mixture 0.4 normal and the temperature being maintained below 60° C., removing alkali metal ions from the mixed sol and solution by passing the mixture in contact with a cation-exchanger in the hydrogen form the effluent having a pH below about 4, and repeating the process using the effluent from the ion-exchanger as the silica sol treated, until the silica concentration of the effluent has been brought up to about from 10 to 20 per cent $SiO_2$.

2. In a process for increasing the silica concentration of a metastable silica sol the steps comprising mixing with a silica sol containing ultimate silica particles less than about 4 millimicrons in diameter and having an $SiO_2$ content of up to 4 per cent a sodium silicate solution having a silica concentration of about from 10 to 36 per cent by weight, with agitation at the point of mixing sufficient to cause homogeneity substantially instantaneously, the proportion of silicate being not more than enough to make the sodium ion content of the mixture 0.4 normal and the temperature being maintained below 60° C., removing sodium ions from the mixed sol and solution by passing the mixture in contact with a cation-exchanger in the hydrogen form, the effluent having a pH below about 4, and repeating the process, using the effluent from the ion-exchanger as the silica sol treated, until the silica concentration of the effluent has been brought up to about from 10 to 20 per cent $SiO_2$.

References Cited in the file of this patent

UNITED STATES PATENTS

| | | |
|---|---|---|
| 2,457,971 | Voorhees | Jan. 4, 1949 |
| 2,573,743 | Trail | Nov. 6, 1951 |
| 2,588,389 | Iler | Mar. 11, 1952 |
| 2,650,200 | Iler et al. | Aug. 25, 1953 |